(12) United States Patent
Ream et al.

(10) Patent No.: US 11,531,184 B2
(45) Date of Patent: Dec. 20, 2022

(54) LASER BEAM POSITIONING METHOD USING A PATTERNED MIRROR

(71) Applicant: Southwest Research Institute, San Antonio, TX (US)

(72) Inventors: Stanley L. Ream, Columbus, OH (US); Craig T. Walters, Powell, OH (US); William C. Flannigan, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 130 days.

(21) Appl. No.: 16/722,283

(22) Filed: Dec. 20, 2019

(65) Prior Publication Data

US 2021/0191072 A1  Jun. 24, 2021

(51) Int. Cl.
*G02B 7/182* (2021.01)
*B25J 9/16* (2006.01)

(52) U.S. Cl.
CPC .......... *G02B 7/1827* (2013.01); *B25J 9/1664* (2013.01)

(58) Field of Classification Search
CPC .................................................. G02B 7/1827
See application file for complete search history.

(56) References Cited

U.S. PATENT DOCUMENTS

| 461,875 | A |  | 10/1891 | Quintus et al. |
| 4,618,759 | A | * | 10/1986 | Muller ................. B23K 26/043 219/121.6 |
| 6,706,999 | B1 | * | 3/2004 | Barrett ................. B23K 26/351 219/121.74 |
| 2007/0086005 | A1 | * | 4/2007 | Gfrorer ................. G02B 21/16 356/318 |

FOREIGN PATENT DOCUMENTS

| JP | S63106717 A | 5/1988 |
| KR | 20150047008 A | 5/2015 |

* cited by examiner

*Primary Examiner* — William R Alexander
*Assistant Examiner* — Sharrief I Broome
(74) *Attorney, Agent, or Firm* — N.V. Nederlandsch Octrooibureau

(57) ABSTRACT

A laser beam alignment system includes at least one mirror with a surface pattern configured to receive and reflect a laser beam, at least one detector configured to detect a deflected portion of a laser beam from the mirror, and at least one controller configured to communicate with the at least one mirror and the at least one detector and to control the mirror position on the basis of the deflected portion of the laser beam.

14 Claims, 10 Drawing Sheets

LASER BEAM POSITIONING METHOD USING A PATTERNED MIRROR

BACKGROUND

Laser technology is used for a wide variety of applications. It is used in daily life products such as DVD players to read information from disks, bar code reading, in surgery, and also in manufacture and maintenance of products, such as for cutting, marking or drilling, as for instance in lithography.

In the field of lithography and computer aided manufacturing systems, positioning stages are sometimes used for interferometric positioning. For example, U.S. Pat. No. 4,060,315 shows a precision laser mirror mount using differential screw actuators and flexure connectors. This system however requires manual alignment of the mirrors.

SUMMARY

According to a first aspect, the present invention provides a laser beam alignment system, comprising: a first deflection system and a second deflection system arranged downstream thereof, said deflection systems each comprising: a frame, and a mirror having a mirror surface for reflecting a portion of a laser beam incident on said mirror surface as a reflected beam portion;

the first deflection system further comprising a movement system connected to the frame and to the mirror for positioning the mirror relative to the frame to adjust the angle of the reflected beam portion relative to the mirror surface;

the second deflection system further comprising:
a plurality of elements arranged in a pattern at the mirror surface of the second deflection system, for deflecting a portion of the laser beam incident on the elements as a deflected beam portion that is different from the reflected beam portion reflected by said mirror; and
one or more detectors, arranged outside the path of the reflected beam portion, for detecting at least part of the deflected beam portion;
at least one controller configured to communicate with the movement system of the first mirror deflection system and the one or more detectors of the second mirror deflection system, and to control said movement system to position the first mirror relative to the frame to align the laser beam on the second mirror based on the detected part of the deflected beam portion.

The laser beam alignment system allows a main part of a laser beam to be reflected from the first mirror onto the second mirror, while continuously adjusting the position at which the beam is incident on the second mirror. The system thus is particularly suitable for keeping a high-powered laser beam aligned as said laser is being used, e.g. for ablation or welding of a surface.

At the one or more detectors a part of the pattern is thus detected, which enables a numeric calculation of the offset of the beam on the second mirror relative to a central mirror position as X and Y position values. In this manner the controller can determine a numerical offset in X and Y of the beam that is incident on the second mirror, allowing subsequent further numeric calculation of the how the movement system should displacement the first mirror. In this manner a digital control loop for continuous alignment of the laser beam can be achieved.

In an embodiment, the deflected beam portion is at an angle of at least 25 degrees to the reflected beam portion.

In an embodiment, the elements of the plurality of elements are arranged for reflecting a beam that is incident at substantially 45 degrees to the mirror surface, in a direction substantially perpendicular from the mirror surface onto the one or more deflectors. Generally, the adjustment of the first mirror relative to the frame will be small, e.g. less than 5 degrees about an X or Y axis of the mirror, and if the second mirror is moveable as well, the degree of movement of the second mirror relative to the detectors of the second deflection system will be small as well, e.g. e.g. less than 5 degrees about an X or Y axis of the mirror. Thus, even if the first or second mirror are adjusted, at least a portion of the deflected beam will likely reach the one or more deflectors.

In an embodiment the beam path between the mirrors of the first and second deflection system is at least 0.5 meters, preferably at least 5 meters, more preferably between 6 and 12 meters. In such systems, a relatively small change or inaccuracy in angle of the first mirror surface may result in a large shift in position of the beam spot on the second mirror surface. The inventions allows such a shift to an be compensated for while the laser beam is in operation, as the angle of the first mirror is adjusted based on a detected portion of the deflected beam portion on the second mirror.

In an embodiment the mirrors of the first and second deflection system are arranged such that the reflected beam from the first deflection system can travel in a direct straight line to the mirror of the second deflection system, e.g. without intermediate reflective surfaces between the two deflection systems.

In an embodiment the mirror surface of the mirror of the first deflection system is substantially planar, and/or the mirror surface of the mirror of the second deflection system is substantially planar. Though mirror surfaces which are curved could be used instead, it is preferred to use a planar mirror surface, as this allows the distance between the deflecting systems to be adjusted in a direction parallel to the beam path without significantly changing the beam shape.

In an embodiment the first and second deflection system are adapted for aligning and reflecting a laser beam which has an average power output of 10 kilowatt or more, preferably 20 or 25 kilowatt or more, during a time period of at least 2 minutes. The beam alignment system thus is suitable to be used for keeping high-powered lasers aligned while the laser is being used, e.g. for cleaning a surface and/or for stripping paint from a surface.

In an embodiment the combined area of the plurality of elements, when seen in projection on the mirror surface, is less than 0.5% of the area a convex hull of the plurality of elements. Because of the relatively small surface area of the elements, most of the laser beam energy will be reflected as the reflected beam portion, rather than be deflected as the deflected beam portion. This ensures that only a small amount of the total the laser beam energy reaches the one or more detectors, thus preventing damage thereto.

In an embodiment, when seen in projection onto the mirror surface, wherein the area of a convex hull of the plurality of element is at least 90 $cm^2$. Thus, the area spanned by the convex hull is significantly greater than the sum of areas of the individual elements of the pattern, resulting in most of the energy of the laser beam incident on the mirror being reflected as the reflected beam portion. For instance, the reflected beam portion generally contains at least 99% or at least 99.8% of the sum of reflected and deflected energy beam portion energy.

In an embodiment wherein the plurality of elements are spaced apart from each other, preferably wherein each element, when seen in projection on the mirror surface, has an area of between 0.01 cm² and 0.25 cm². By spacing the elements apart from each other, e.g. by distances between 0.2 and 2.5 cm, the elements can be individually detected by the one or more detectors, making it possible to determine at which location in the pattern the laser is centered.

In an embodiment the pattern includes one or more of: elements arranged spaced apart from each on two or more lines, which lines at an angle to each other, preferably wherein the lines are at angles of integer multiples of 45 degrees to each other; and elements arranged spaced apart from each other on concentric circles. For instance, the pattern may comprise an "+" shape, and "X" shape or a "+" shapes centered on and overlain on the "x" shape.

In an embodiment the second deflection system further comprises a movement system connected to the frame and to the mirror for positioning the mirror relative to the frame to adjust the angle of the reflected beam portion relative to the mirror surface; the system further comprising a third deflection system downstream of the second deflection system, the third deflection system being provided with:—a frame; —a mirror having a mirror surface for reflecting a portion of a laser beam incident on the mirror as a reflected beam portion; —a plurality of elements arranged in a pattern at the mirror surface of the second deflection system, for deflecting a portion of the laser beam incident on the mirror as a deflected beam portion that is different from the reflected beam portion reflected by said mirror; and—one or more detectors, arranged outside the path of the reflected beam portion, for detecting at least part of the deflected beam portion; wherein the at least one controller is configured to communicate with the movement system of the second deflection system and the one or more detectors of the third deflection system, and to control said movement system of the second deflection system to position the second mirror relative to the frame to align the laser beam on the third mirror based on the detected part of the deflected beam portion. The beam alignment system is thus suitable for keeping a laser beam aligned is reflected in multiple deflection systems. It will be appreciated that additional deflection systems can be arranged in series downstream of the third deflection system.

In an embodiment the second deflector system comprises safety detectors for detecting whether a part of the laser beam travels past the mirror without being incident on the mirror surface or the plurality of elements and/or whether part of the laser beam is within a predetermined distance of an outer edge of the mirror. The safety detectors are typically connected to a safety-shut down system of the laser, which safety shut-down system is adapted for switching off the laser as soon as at least one of the safety detectors detect a part of the laser beam traveling past the mirror or with the predetermined distance from the edge. For additional safety, preferably, two redundant sets of safety detectors are provided, each connected to a separate safety shut down system of the laser.

According to a second aspect, the invention provides a robot system comprising a mobile base on which a mast is mounted, wherein an arm is moveably mounted on the mast, and wherein a wrist is moveably mounted on the arm, the robot system further comprising a laser beam alignment system according to the invention, wherein said laser beam alignment system is arranged within the mast, arm and/or the wrist. The beam alignment system can thus be used for keeping the laser beam aligned during movement of the robot, its arm, mast and or wrist. This is particularly important when the dimensions of the robot are relatively large. For instance, the robotic system may comprise a laser source mounted on the base, wherein the mast is rotatable relative to the base and has a height of at least 8 meters. The arm may have a length of at least 8 meters and may be translatable along its longitudinal direction relative to the mast, wherein the arm may be translatable along the longitudinal direction of the mast, and/or wherein the arm is rotatable around a horizontal axis relative to the mast. The mobile base allows the robot to move around an object onto which a reflected portion of the laser is to be applied.

In an embodiment the robot system further comprising a high-power laser generator for generating a laser having an average power output of at least 10 kilowatt during a time period of at least 2 minutes. The high-power laser generator is typically mounted on the mobile base.

In an embodiment, the laser generator is adapted for generating the laser beam with a diameter greater than 6 cm, preferably with a diameter between 7 and 10 cm.

In an embodiment the robot system further comprises a low-power laser generator for generating a beam of visible laser light having an average power output of less than 30 watt, wherein the controller is adapted, for, prior to activating high-power laser generator, carrying out initial alignment of the mirrors in the beam alignment system using the low power laser. By carrying out a rough alignment of the deflection systems using the lower power laser, before activating the high power laser, the risk of accidental misdirection of the high power laser is reduced.

According to a third aspect, the invention provides a laser beam alignment method, comprising the steps of:

a) reflecting a laser beam in a first mirror to a second mirror, wherein the first mirror is connected to a frame via a movement system that is adapted for positioning the first mirror relative to the frame to adjust the angle at which the laser beam is reflected from the first mirror to the second mirror;

the second mirror comprising a mirror surface for reflecting a portion of the laser beam incident on said mirror surface as a reflected beam portion, and comprising a plurality of elements arranged in a pattern at the mirror surface for deflecting a portion of the laser beam incident on said elements as a deflected beam portion that is different from the reflected beam portion;

b) detecting, at a position spaced apart from a main axis of the reflected beam portion, at least a part of the deflected beam portion, c) based on the detected part of the deflected beam portion, controlling the movement system to position the first mirror relative to the frame such that the reflected beam portion is reflected from the first mirror onto the second mirror with its main axis at a desired position relative to the pattern. The method allows the laser beam to remain aligned, even if the relative positions of the deflection systems of which the positions vary by several meters while the laser beam is activated.

In an embodiment the method further comprises determining, based on the deflected beam portion which contains an image of part of the pattern, a position of a beam centroid on the second mirror relative to the pattern based on the detected deflected beam portion, and wherein step d) comprises controlling the movement system based on the relative position of the beam centroid to the pattern. The beam centroid may for instance be determined based on positions of detected elements which are at a greatest distance to each other.

In an embodiment the laser beam is a low-power laser beam, and when the desired position has been reached through step c), the method further comprises: switching off the low-power laser beam; switching on a high-power laser beam; and performing steps a) to c) with the high-powered laser beam.

In an embodiment the laser beam is a high-powered laser beam having an average power output of at least 10 kilowatt during a time period of at least 2 minutes, wherein steps a)-c) are repeated during said time period at a frequency of at least 10 Hz. Preferably the average power output of the laser beam during said time period is at least 20 kilowatt.

According to a fourth aspect, there is provided a laser beam alignment system comprising at least one mirror with a surface pattern configured to receive and reflect a laser beam, at least one detector configured to detect a deflected portion of a laser beam from the mirror, and at least one controller configured to communicate with the at least one mirror and the at least one detector and to control the mirror position on the basis of the deflected portion of the laser beam.

Advantageously, the invention provides a precise alignment of a laser beam which reflects on or strikes one or more mirrors, in an accurate and safe manner. This is especially advantageous for applications such as those mobile or robotic, and which require dynamic alignment to compensate for mechanical deflection, vibration, shock loads or other forces that might cause a statically aligned system to become misaligned.

The present invention may be applied to large robotic laser coating removal (LCR) systems, such as those described herein, wherein a robot will experience structural deflections as it moves, and because the robot structure carries mirrors for laser beam delivery, re-alignment of the mirrors is necessary as the robot moves, in particular when the robot moves while the laser is activated.

Throughout the application, "reflected" will be used to refer to a beam that strikes a mirror surface at an angle with respect to the plane perpendicular to the mirror surface plane, and that reflects forming the same angle. "Deflected" will be used to refer to a beam that strikes the mirror surface forming one angle and that, due to the surface patter on the mirror, is reflected forming a different angle.

According to an embodiment, the at least one mirror comprises a surface pattern, and the at least one detector is configured to detect the deflected portion of the laser beam based on the surface pattern. The surface pattern is designed such that it minimizes the amount of light deflected towards the detector and maximizes the accuracy of the beam centroid measurement.

According to an embodiment of the system, the surface pattern is a pattern formed by a plurality of dimples on the mirror surface. The dimples may be, for example, features milled into the mirror surface which contribute to deflect a very small amount of the laser energy towards the detector.

According to an embodiment, the surface pattern is a circular or X-shaped pattern. This are however mere examples, and the skilled person will understand that the specific shape of the pattern can vary greatly, and that other suitable surface patterns are possible. According to an embodiment, the surface pattern is such that a sufficient number of dimples are within the laser beam. This allows for a more accurate positioning by being able to perform triangulation. According to an embodiment, a symmetric pattern is used. This allows the use of simpler algorithms for an accurate positioning.

According to an embodiment, the laser beam is a high-power laser beam, for example, a high powered infrared laser beam or $CO_2$ laser beam. This is advantageous for applications such as coating removal in for instance large structures or vehicles, such as aircrafts, where a large amount of directed energy is required, and a high-power laser can be used to ablate organic coatings by scanning a laser sport across the surface.

According to an embodiment, the laser beam is a low-power laser beam, for example, a red light laser beam. This can be advantageous for applications requiring a smaller amount of directed power. It can also be advantageous for applications for coating removal in large structures or vehicles, such as aircrafts, as an additional step for aligning the mirrors in the system, for example prior to engaging the high-power laser.

According to an embodiment, the at least one detector comprises a camera for capturing the deflected portion of the laser beam and for detecting the laser beam position on the mirror surface on the basis of the deflected portion of the beam. The detector may be any kind of suitable light detector. If the detector is a camera, the camera may receive or capture the deflected portion of the laser beam and based on the captured image it may allow detection of the position of the laser beam on the mirror surface.

According to an embodiment, the camera can be an infrared camera and/or a visible wavelength camera. The infrared camera may be used to detect the deflected portion of the high-power laser beam, and the visible wavelength camera may be used to detect the deflected portion of the low-power laser beam.

According to an embodiment, the at least one detector comprises a first detector configured to detect a deflected portion of a first laser beam from the mirror, and a second detector configured to detect the deflected portion of the high-power laser beam after the position of the low-power laser beam has been controlled. The system may comprise two detectors: a first detector which is used initially to detect light of a low-power laser beam deflected from the at least one mirror, in order to perform initial alignment of the laser beam; and a second detector which is used after the laser beam has been initially aligned and a high-power laser beam has been switched on. The second detector (or simply, the detector, or the at least one detector) is used to detect the deflected portion of the high-power laser beam from the at least one mirror.

According to an embodiment, the at least one mirror comprises a plurality of mirrors placed in a cascade configuration, and the at least one detector comprises a plurality of detectors, wherein at least one detector corresponds to each mirror. The system may further comprise one mirror, which receives light directly coming from a laser beam source and reflects it to a final destination of the laser beam, such as an end tool, or it may comprise a plurality of mirrors. In the latter scenario, a first mirror may be configured to receive a laser beam coming from the laser beam source, and to reflect the laser beam to a second mirror. This second mirror may be then configured to further reflect the laser beam, and this configuration can include as many mirrors as necessary, which can be adapted to the structure of, for example, a robotic arm which comprises different movable sections, and through which the laser beam must travel.

According to a fifth aspect, and in accordance with the advantages and effects described herein above, there is provided a laser beam alignment method, comprising the steps of:
a) deflecting a portion of a laser beam from a mirror surface;
b) detecting a position of the laser beam on the mirror surface based on the deflected portion, and
c) controlling the laser beam based on the detected position and on a desired position on the mirror surface.

The laser beam alignment method allows for a precise alignment of a laser beam which reflects onto one or more mirrors in an accurate and safe manner. This dynamic and automatic aligning method provides a simple and yet accurate mechanism for laser beam alignment using a mirror system.

According to an embodiment, the laser beam is a low-power laser beam, and when the desired position has been reached through step c), the method further comprises switching off the low-power laser beam, switching on a high-power laser beam and performing steps a) to c) with the high-power laser beam.

The method according to an embodiment may thus be used to first control the position of a low-power laser beam, and once the desired position has been reached, controlling the position of a high-power laser beam using the same method steps. This advantageously allows to initially align the mirror or mirrors in the system using the low-power laser beam, which is safer and more appropriate for initial alignment, in a situation in where the mirrors initial position may be considerably off the desired position. When the mirror or mirrors have been initially aligned, the high-power laser beam may be safely used.

According to an embodiment, controlling the laser beam comprises controlling the laser beam to be moved close to a desired position. The desired position, for example, may be the centre of the mirror surface. However, other specific positions in the mirror surface can be the desired position, which can be predefined or determined during alignment.

According to an embodiment, the step of deflecting a portion of a laser beam from a mirror surface comprises deflecting a portion of a laser beam from a mirror surface using a surface pattern on the mirror surface.

According to an embodiment, detecting the position of the laser beam on the mirror surface comprises obtaining an offset value between a centre of the laser beam and the desired position on the mirror surface. This allows a system performing the method to easily and efficiently determine how much and in which direction and angle the laser beam needs to be moved and/or tilted for the position to be corrected.

According to an embodiment, a system performing the method comprises a plurality of mirrors, and the steps a) to c) are performed for each mirror.

According to an embodiment, step c) comprises controlling the laser beam based on the detected position and on a desired position on the mirror surface by adjusting and/or moving a previous mirror to change the reflected position on the mirror on which the position is detected.

According to an embodiment, step b) comprises detecting a position of the laser beam on the mirror surface based on a camera capturing a deflected portion of the laser beam.

According to a sixth aspect of the invention, there is provided a mirror for a laser beam alignment system, the mirror comprising a frame, a mirror surface supported by the frame able to reflect a laser beam, and a pattern on the mirror surface for deflecting a laser beam. According to an embodiment, the mirror further comprises one or more movement systems for moving the mirror and connected to the mirror and/or the frame. According to an embodiment, the mirror further comprises one or more detectors directed toward the mirror surface and connected to the frame.

The figures are meant for illustrative purposes only, and do not serve as restriction of the scope or the protection as laid down by the claims.

DETAILED DESCRIPTION

Figure 1:
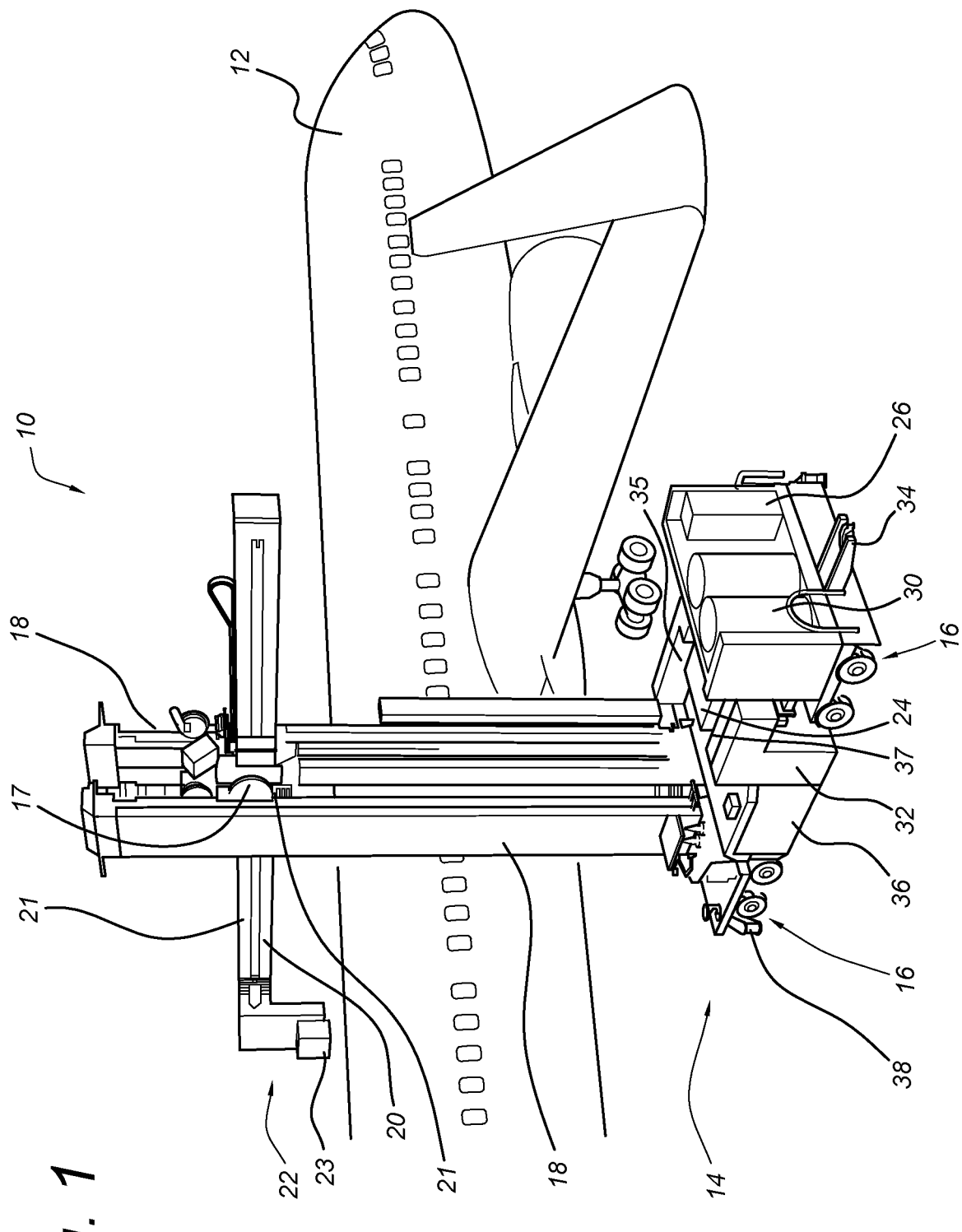
FIG. 1 illustrates a perspective view of a robotic system used for surface treatment of large vehicles.

FIG. 1 illustrates a perspective view of a robotic system 10 used for surface treatment of large vehicles. While system 10 is shown and described as a paint removal system using a high-power laser to ablate coatings by scanning a laser across a surface of aircraft 12, it should be understood that system 10 could be used to provide many different surface treatments, such as painting, sanding, direct printing, applying or removing other coatings or surface treatments, washing, wipe-down, surface scanning or inspection and repairs. Additionally, system 10 could be used with other vehicles or structures, such as helicopters, ships, trucks, cars, underwater vehicles, space craft; or any vehicles or structures that involve large areas and/or complicated positioning to reach all surfaces.

System 10 is a self-contained surface treatment system with mobile base 14 connected to omnidirectional bogies 16. Base uses four bogies 16, which can be moved in any direction through the use of two sets of Mecanum wheels associated with each bogie 16 and a flexible suspension system to allow for smooth driving and stable parking for operations.

Any needed utilities, such as electrical power, cooling water and gas may be provided via a tether which can connect to umbilical coupling 34 on base 14. In some cases, only some utilities or even none of these would be needed (e.g., power is provided by batteries on base), making system 10 flexible for operations at a variety of locations, and easily maneuverable without a lot of cords or connections.

Mobile base 14 is able to accommodate various aircraft and hangar variations by being relatively compact yet stable such that it can drive up to aircraft 12, "park" itself and provide a stable base for operations. Omnidirectional bogies 16 and a flexible suspension system result in mobile base 14 being able to evenly distribute the large load of system 10 while also being able to smoothly navigate areas that are not level or have obstacles. The flexible suspension system of bogies 16 allow for base 14 to be in a drive mode (see FIG. 1b) where base and jacks 38 are raised above ground level (with sufficient clearance for obstacles), and then to allow jacks 38 (and possibly overall base 14) to be lowered such that system 10 weight rests on jacks 38 for park mode (see FIG. 1c) and wheels on bogies 16 carry little to none of the system 10 weight during operations. This ensures a stable base such that the movements of arm 20 and wrist 22 are supported during operations to minimize the risk of damage to treatment surfaces.

System 10 also includes a number of other components on base 14 related to the particular surface treatment, in this system, laser generator 24, laser power unit 26, control system cabinet 28, gas holders 30, filtration unit 32, umbilical coupling 34, heat exchanger 35, scanner 36, hydraulic system 37 and jacks 38. Other systems could include other components supported by base in addition to or in lieu of the components shown on base 14. These could include, for example, exhaust filters, batteries, paint and/or paint lines, etc.

Surface treatments are delivered from base 14 through mast 18, shoulder 19, arm 20 and wrist 22, which in this case together provide the structure to enable the laser beam to transport from base 14 to any desired point on the aircraft 12 surface. Mast 18 and arm 20 are extendable and are able to rotate (e.g., through linear gears 21 and rotary gears 17), though the rotation of mast 18 may be through base 14 movement or rotation. Shoulder 19 allows for the rotation and translation of arm 20 with respect to mast 18. In some embodiments, arm 20 could be a telescoping arm instead of a translating arm. Arm 20 is also able to move up and down through the length of mast 18 through linear gears 21. Wrist 22 provides more axes of flexibility, for example 3, to provide system 10 the ability to reach and treat all surfaces of aircraft 12. Movement systems shown can vary depending on mast 18, shoulder 19, arm 20 and wrist 22 configuration, the treatment surface and/or other requirements.

The laser is transported from base 14 to wrist 22 through hollow portions of mast 18, arm 20 and wrist 22 and is guided by a series of mirrors with a mirror control and alignment system to ensure accurate laser beam positioning, as detailed in relation to FIGS. 2a-3b. System 10 also includes an exhaust gas system for removing the effluent through the interior of mast 18, arm 20 and wrist 22; and a system for positioning and orientation of all system 10 components with respect to aircraft 12.

Control of robotic system 10 can be either automatic or manual. Typically, at the start of an operation, the type of aircraft 12 (or other structure) is selected. A positioning system is used to determine the position and orientation of the aircraft 12. This typically involves hanging a number of targets at known positions on the aircraft, and using scanner(s) 36 to map the target positioning with the known aircraft dimensions and configuration such that robotic system is able to accurately position output 23 of wrist 22 to direct the laser at any surface of the aircraft 12 without contacting that surface. This is important due to the large sizes and complicated geometries of aircraft 12, and the susceptibility of damage to aircraft 12 surface from any contact.

Once positioning is known, robotic system can be moved to a desired starting location. Bogies 16 can drive base to a first position (e.g., near a front portion of the aircraft 12 and at a position that output 23 is able to reach the very front knowing the lengths which arm 20 and wrist 22 can extend). Base 14 can then be put in a park mode (see FIG. 1c), where bogies 16 flexible suspension system lowers base 14 and jacks 38 such that base 14 is at least primarily supported by jacks 38 (instead of wheels). Operations can then begin. Arm 20 and wrist 22 are positioned at a starting position. Laser alignment is checked, and then high-powered laser beam may be turned on. Robotic system arm 20 and wrist 22 movement can follow a pre-programmed path to ensure all surfaces are sufficiently treated, and more than one pass may be used if needed. Laser can also be adjusted such that only certain layers are removed. Optical sensors (or other sensor means) can be used to ensure that the laser avoids obstacles (e.g., windows).

The laser can sweep very quickly, for example 200 times per second, to ensure efficient surface treatment despite the large and complicated surface area of aircraft 12. In addition, a camera or other sensor can be used to ensure that the laser is effectively removing the desired layers. This can be done, for example, through using a photo taken one or more times per sweep for color and appearance analysis. The laser power, and robotic movement and speed can be updated continuously based on this sensing and analysis.

During laser operations, effluent removal system also works to remove the gases generated. Effluent removal channels have negative pressure generated from base 14 (e.g., through a filtration system on base 14) such that effluent gets suctioned through wrist, arm and mast to base 14 where it can be cleaned (e.g., through filters in filtration unit 32) and properly disposed of (e.g., clean gas is released after the cleaning in filters). The suction provided must be at a level that exhaust gas and micro pollution at the point of laser removal is taken into effluent removal channels with the exhaust gas. Output 23 can have a specific configuration, such as an effluent channel input fully surrounding the laser channel output to promote the full suctioning of all exhaust gases. Such a configuration could then transition into the channels shown in FIG. 4a of arm (which are also typically the channels which form wrist 22). Filtration unit 32 can also provide additional air or other cases for cooling of effluent. Effluent channels can include vanes at various positions to help gases move in the correct direction, particularly when moving around a tight corner, such as the travel from arm 20 to vertical mast 18.

When robotic system 10 has removed all coatings within the reach of arm 20 and wrist 22, system 10 may be moved to a second position in relation to aircraft 12 such that it can reach untreated surfaces. The same procedure is used for moving, parking and then operations. When the full surface of the aircraft has been treated, robotic system 10 can move to a different location for storage or to begin new operations.

Past surface treatment systems for paint removal on an aircraft typically involved manual application of solvent or sanding. Robotic system 10 provides an efficient method for surface treatment that is able to treat the complicated surface geometry of aircrafts while minimizing the risks of damage to the aircraft and the manual labor needed. The use of a high-powered laser can efficiently and effectively remove coatings, and the movements systems of base 14, mast 18, shoulder 19, arm 20 and wrist 22 enable the laser to reach the desired positions without the need for manual intervention. The laser alignment system ensures that the laser stays properly aligned through the use of moveable mirrors despite all movements and turns to reach different surfaces, ensuring a safe system even when using high powered laser beams. The mobile base 14 allows for easy and flexible movement to desired positions to accommodate many different aircraft and hangar (or other treatment location) variations.

Figure 2A:
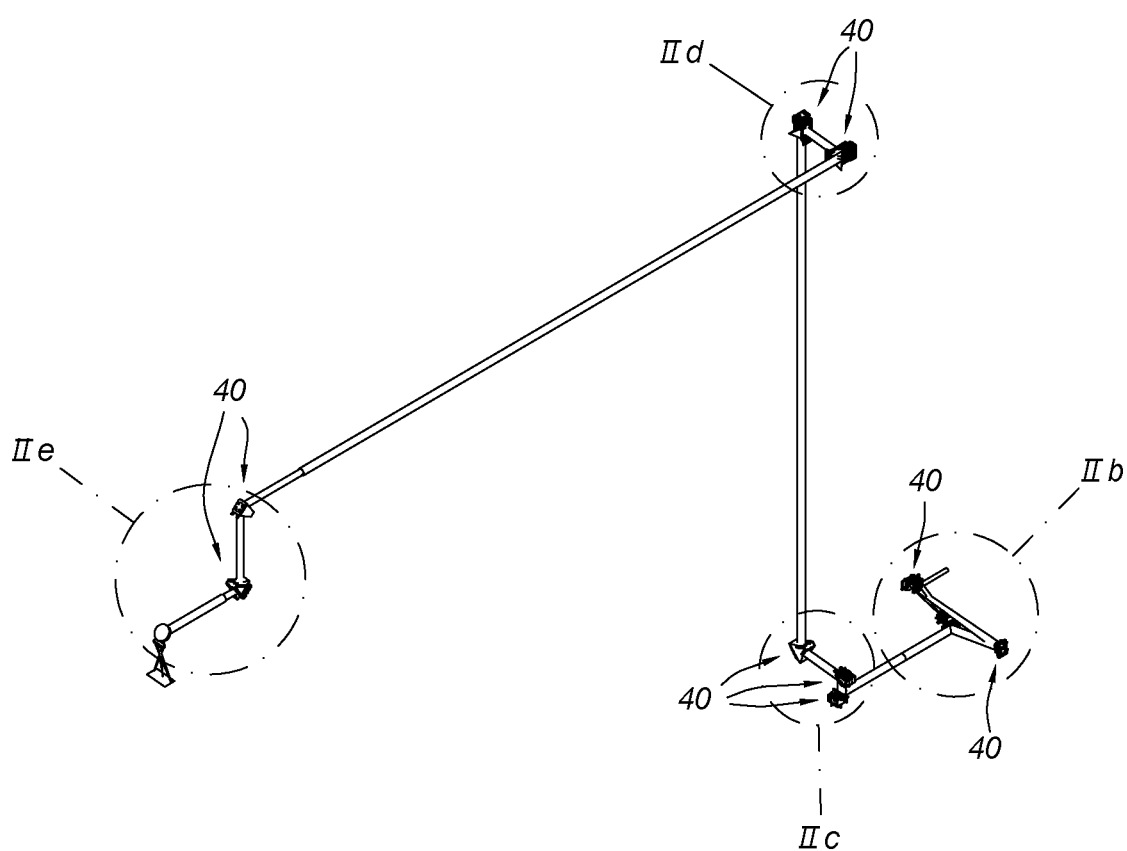
FIG. 2a shows a view of a laser path through the robotic system of FIG. 1 according to the present invention.
Figure 2B:
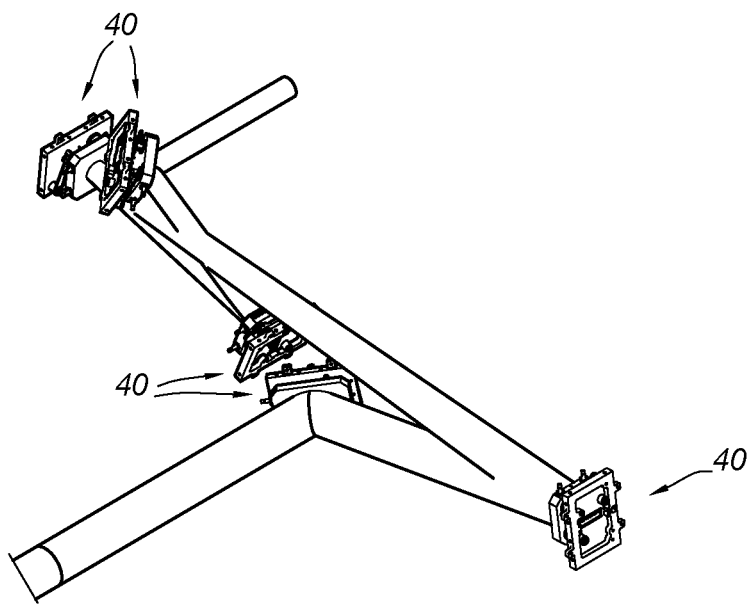
FIGS. 2b-2e shows close up portions of FIG. 2a according to the present invention.
Figure 2C:
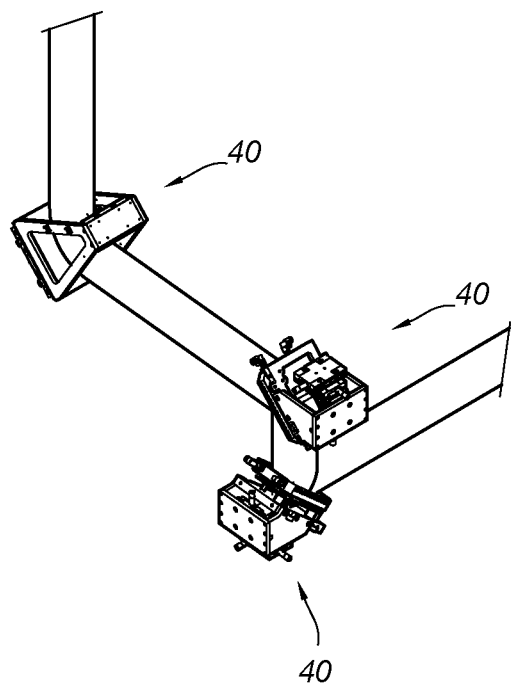
Figure 2D:
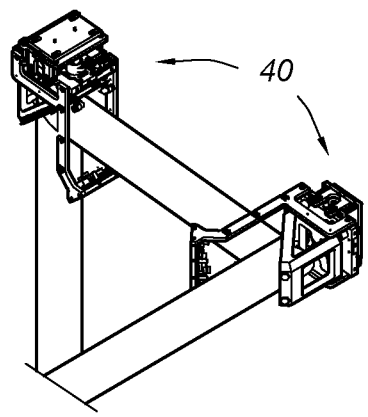
Figure 2E:
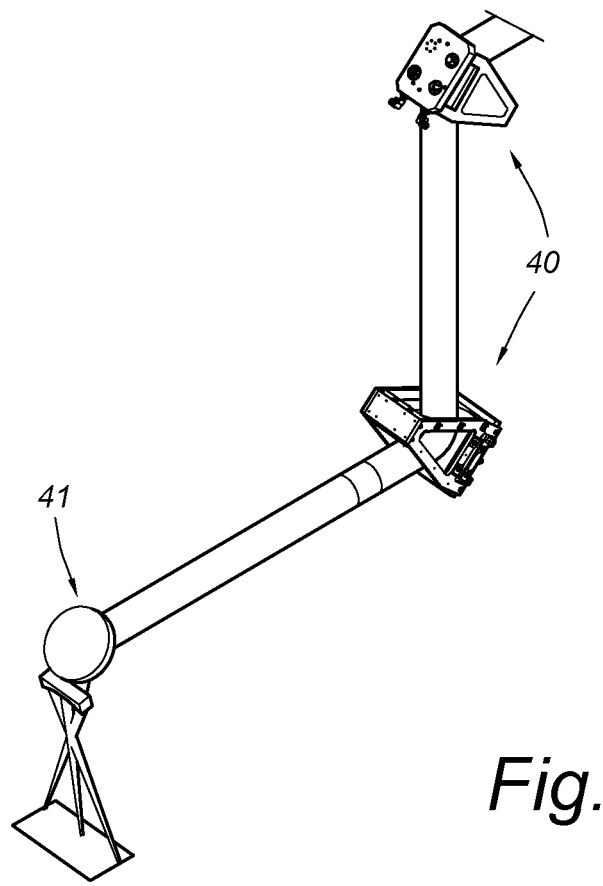

FIG. 2a shows a view of a laser path through robotic system 10 according to the present invention, FIGS. 2b-2e show close up portions of the laser path.

Laser path is guided by laser beam alignment systems, also called deflection systems 40, located at every point the laser needs deflection to follow the path desired from the laser source to the desired surface treatment point on the aircraft 12. In system 10, laser beam is deflected by eight laser beam alignment systems 40 (shown in FIGS. 2b-2c) on base 14 to enter mast 18 at the desired location (in a centre of a laser channel). The laser is deflected vertically up mast to shoulder 19, where it is then deflected horizontally to enter arm 20 and then deflected to extend toward wrist 22 (shown in FIG. 2d). At wrist 22, laser is deflected by two different laser beam alignment systems and then is reflected toward the surface of the aircraft 12 (or other desired surface) by one or more mirrors 41 at an output 23 of wrist 22.

Figure 3:
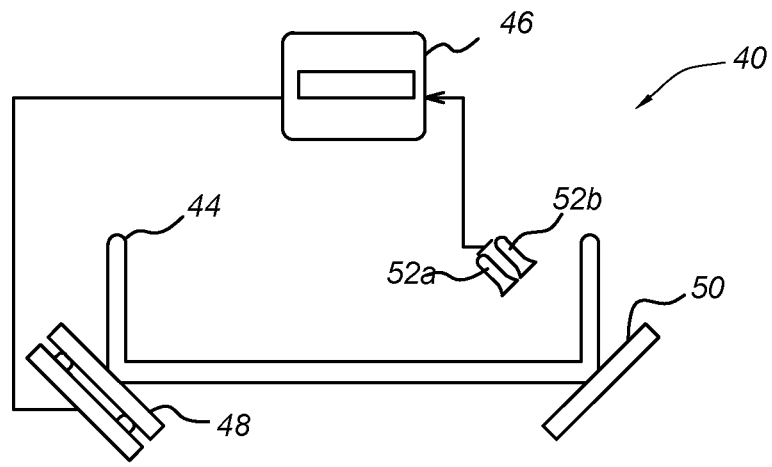
FIG. 3 schematically shows a laser beam alignment system according to the present invention.

FIG. 3 schematically shows a laser beam alignment system 40 according to the present invention.

The alignment system 40 of FIG. 3 may be located inside the hollow structure formed by mast 18, shoulder 19, arm 20 and/or wrist 22 as shown in the system of FIG. 1, and may thus correspond to one of the laser beam alignment systems as shown in FIG. 2. Alignment system 40 is a dynamic laser beam alignment system that can be integrated in the system of FIG. 1 (or other systems) to maintain the laser beam transport independent from structural deflections. The alignment system 40 comprises, a first mirror 48, a second mirror 50, a first detector 52a for the second mirror 50, a second detector 52b for the second mirror 50, and a controller 46. A laser beam 44 from a laser source, e.g. the laser generator 24, is schematically indicated and is reflected from the first mirror 48 to the second mirror 50.

The laser beam 44 may be a high-power laser beam, or a low-power laser beam, or any suitable type of laser beam. If the laser beam is a high-power laser beam, it may be an infrared laser beam. The high-power laser beam may be a 20 kiloWats $CO_2$ laser, with a diameter of for example approximately 9 centimetres, which may be developed to remove a wide variety of coatings from many surfaces including metal and composite substrates. The low-power laser beam may be a visible light laser beam, such as a red laser beam or red light beam.

The first mirror 48 can be located at a first location within the hollow structure, such that the laser beam coming from the laser beam source will first strike the first mirror 48. The second mirror 50 is then located at a position within the hollow structure which is further from the laser beam source than the location of the first mirror 48. The first mirror 48 is configured to receive the laser beam 44 and reflect it in the direction of the second mirror, and the second mirror 50 is configured to receive the laser beam reflected from the first mirror 48 and reflect it in the direction of a further mirror, or in the direction of an end tool or output of the system.

The first detector 52a for the second mirror 50 is a detector, which can be located substantially in front of the mirror surface of the second mirror 50, pointing towards the mirror surface. As an example, the first detector 52a may be mounted directly above the second mirror 50. The first detector 52a is configured to detect at least a portion of a low-power laser beam deflected from the second mirror 50. Because not all the laser beams have the same characteristics (energy, beam width), specific detectors can be adapted to detect only energy from certain laser beam types. The distance between the first mirror 48 and the second mirror 50 may vary, and in an embodiment it may go from a minimum of 50 centimetres, such as in the section corresponding to the wrist 22 of FIG. 1, to a maximum of 15 meters, such as in the section corresponding to the mast 18 of FIG. 1. The distance could however be smaller or larger as long as it allows the laser beam to properly strike on the mirror surface.

The second detector 52b for the second mirror 50 is located at a similar position with respect to the second mirror 50 to the first detector 52a. The second detector 52b is configured to detect at least a portion of the high-power laser beam deflected from the second mirror 50. The deflected portion of the light beam may be very small, such as from approximately 2 Wats, which may represent approximately 0.01% of the laser beam total power, to approximately 0.1% of the laser beam total power. Because the total amount of deflected light is small, a high power detector is not required.

The first detector 52a and the second detector 52b are configured to, based on the portion of the laser beam deflected, determine the position of the laser beam incident in the second mirror 50. The detectors may be any kind of suitable light detectors, for example, cameras which are configured to receive or capture the deflected portion of the laser beam and based on the captured image they may detect the position of the laser beam on the mirror surface. The detectors may have a shield or protective layer to protect the detector from receiving too much energy from the mirror.

The first detector 52a and the second detector 52b may be integrated each in a printed circuit board, or together in the same printed circuit board, and said printed circuit board may also comprise a microprocessor to process the position detected by the detectors. If the detectors are cameras, the microprocessor can be configured to perform image processing, or such image processing can be performed at a remote location which communicated with the detectors through wired or wireless connections.

The controller 46 is configured to control an alignment and correction operation. When a laser beam reaches the surface of a mirror, depending on the orientation of the mirror, the laser beam will be reflected from the surface of the mirror towards a specific direction. It is important that the direction followed by the laser is correct so that it does not reach an unwanted surface, which could cause damages. This is especially critical when a laser beam is used for applications which require a high level of accuracy, for example, when multiple mirrors are used. In the embodiment of FIG. 3, the controller 46 is configured to receive from the first detector 52a and the second detector 52b the detected position on the mirror surface of the second mirror 50 where the laser beam strikes. The controller 46 thus may receive, from the first detector 52a, information about the detected position of the low-power laser beam, and from the second detector 52b, information about the detected position of the high-power laser beam. Using this information, the controller 46 may compare the detected position with the desired position of the laser beam 44 on the mirror surface.

The controller 46 then may be able to, based on the result of the comparison, determine the direction and the distance that the first mirror 48 has to move and/or tilt in order for the laser beam incident on the first mirror 48 to be reflected towards the second mirror 50, so that the laser beam hits the second mirror 50 on the desired position. The controller may then control the first mirror 48 to move and/or tilt in the determined direction and distance in order to align the laser position.

In addition, although not shown in FIG. 3, the system may comprise one or more extra safety sensors that provide a signal, such as a binary signal, to indicate positively that the high-power laser beam is striking the mirror. Algorithms may be implemented by the controller 46 to determine the laser beam centroid position and the cross-sectional shape as an indication of the beam quality. The controller 46 may comprise image processing algorithms which calculate the centroid of the laser reflection from dimples (see FIGS. 7a-7b), thus providing a measurement of the laser beam's position. Other algorithms calculate the shape of the laser reflection, which provides an indication of the beam quality. Still other algorithms may be used to detect the intensity of the laser beam to measure laser power and detect other abnormalities, such as dirty mirrors.

The desired position on the mirror surface is the position which makes the laser beam be reflected towards a direction for optimal functioning of the system. This desired position may be a position that allows the laser beam to be reflected as parallel as possible to the walls of the surrounded structure (the hollow structure). The desired position may be the centre of the mirror surface, or a point at a specific distance from the centre of the mirror surface.

Although not shown in FIG. 3, an embodiment may also comprise at least one additional detector, located at a similar position as the first detector 52a and the second detector 52b, which may be a camera, in order to determine whether the beam has been disrupted and has not reached the second mirror 50. This may provide an additional safety mechanism to the system, because the detectors 52a and/or 52b may detect a portion of light deflected which does not correspond with a normal functioning of the system. According to an embodiment, more than one additional detector may be used to further improve the safety of the system.

Figure 4:
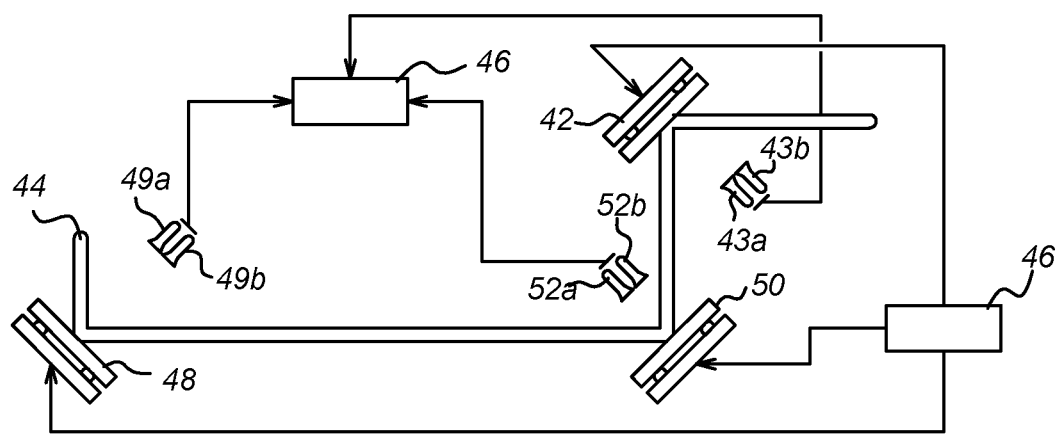
FIG. 4 schematically shows another laser beam alignment system according to the present invention.

FIG. 4 schematically shows another laser beam alignment system 40 according to the present invention.

The system of FIG. 4 is similar to the system of FIG. 3, wherein an additional third mirror 42 is placed at a location, for example, within the hollow structure, which is further from the laser beam source than the location of the second mirror 50. The third mirror 42 is configured to receive a laser beam reflected from the second mirror 50 and to reflect it to a further mirror or to an output of the system. Detectors 43a and 43b may be similar to detectors 52a and 52b, and they are configured to detect at least a portion of a deflected laser beam incident on the third mirror 42. The controller 46 is according to this embodiment also configured to receive the laser beam position from detectors 43a and 43b. Although FIG. 4 represents controller 46 as two separate elements, the skilled person will readily understand that a controller may be formed by one element or multiple elements communicating with each other.

FIG. 4 also shows a first detector 49a and a second detector 49b for the first mirror 48. The detectors for the first mirror 48 may detect a position of the laser beam on the surface of the first mirror 48, so that the controller 46 can also use the detected position to adjust the first mirror 48, and/or the laser beam source.

Although FIGS. 3 and 4 represent a system with two and three mirrors, respectively, laser alignment systems according to the present invention can also comprise more than three mirrors, which guide the laser beam from the source in the base of the robot pictured in FIG. 1 to the end tool of the system through the hollow structure formed by the robot parts.

Figure 5:
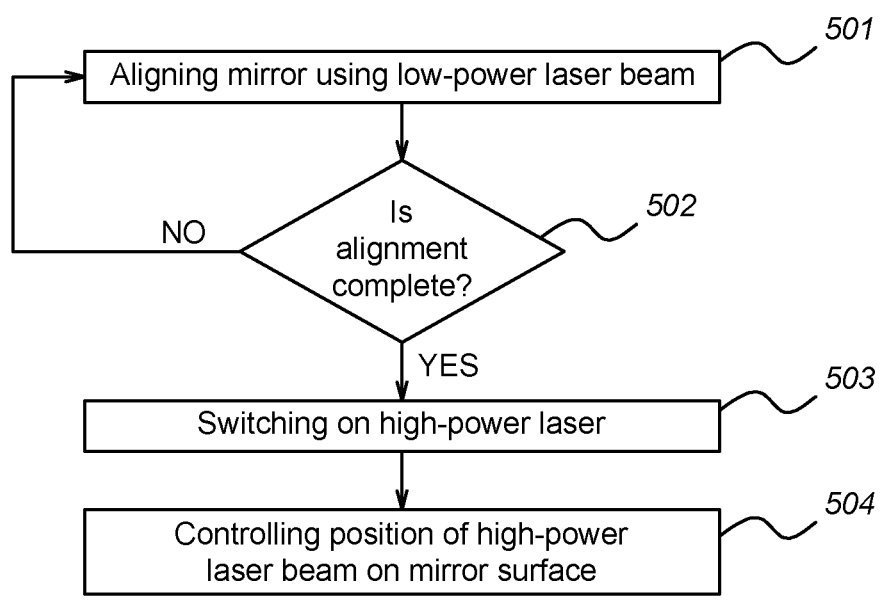
FIG. 5 shows a flow chart illustrating a laser beam aligning method according to the present invention.

FIG. 5 comprises a flow chart illustrating a laser beam aligning method 500 according to the present invention. By way of example, the method will be explained with reference to the system of FIG. 3, but it should be apparent that a similar method will be applied to other systems, for example, a system comprising more mirrors such as the system of FIG. 4.

In a first step 501, an initial mirror alignment is performed using the low-power laser beam. In this initial step, the mirrors constituting the system may be misaligned. Because a high-power laser beam can be more dangerous if the laser beam reflects on an undesired surface, for an initial alignment, wherein the misalignment of the mirrors may be considerable, the high-power laser beam is switched off, and a low-power laser beam is used. Such a low-powered laser beam would result in little to no damage even if severely misaligned and directed at undesirable surfaces.

During the first step, the first detector 52a of the second mirror 50 detects a position on the mirror surface where the laser beam strikes. This may be done by detecting a deflected portion of the laser beam in the direction of the first detector 52a, and based on the deflected portion, obtaining a position of the laser beam on the mirror surface. After that, the first detector 52a transmits the detected position to the controller 46 and the controller can determine the distance and direction the laser beam needs to move in order to reach the mirror surface at a desired position, which may be the centre of the mirror surface. The controller 46 can afterwards control the first mirror 48 to move and/or tilt in order to make the laser beam be reflected in the direction that will reach the desired position on the surface of the second mirror 50. This process may be similarly implemented for the third mirror 42 of FIG. 4, automatically and dynamically in step 502 until the detector for each mirror detects that the low-power laser beam incident on the mirror surface does so on the desired position. While this is discussed as a "desired position" it would be understood by those in the art that this can encompass a number of positions on the mirror surface which are within a range of acceptable positions, depending on the system, laser, etc.

Once the alignment has been complete, the high-power laser beam can be used for the required application, such as for removing coating from a vehicle such as an aircraft. For this, step 503 is implemented, wherein the low-power laser beam is switched off and the high-power laser beam is switched on. Initially, the mirrors are aligned from the previous step, however, because the mast 18 and the arm 20 of the robotic structure are each movable to move the wrist and output to different desired positions, this displacement will misalign the mirrors, and therefore a constant alignment and re-alignment of the laser beam (through the adjusting of the mirrors) needs to be performed automatically and dynamically.

Step 504 is then initiated, wherein in this case the second detector 52b will detect the position of the laser beam incident on the mirror surfaces of the second mirror 50. This step is similar to step 501, only instead of the low-power laser beam, the high-power laser beam is used.

Although the method 500 is performed in a similar way for the low-power laser beam alignment and the high-power laser beam alignment, the lower-power laser allows for manual coarse adjustment of the mirrors by an operator. This starting with a low-power laser beam ensures that both the proper starting alignment is achieved and that the system is functioning properly before the high-power laser beam is switched on. Thus, this method results in a safe system which avoids the use of the high-powered laser beam which could damage system or surrounding components until the system is deemed properly aligned and safely working.

Figure 6:
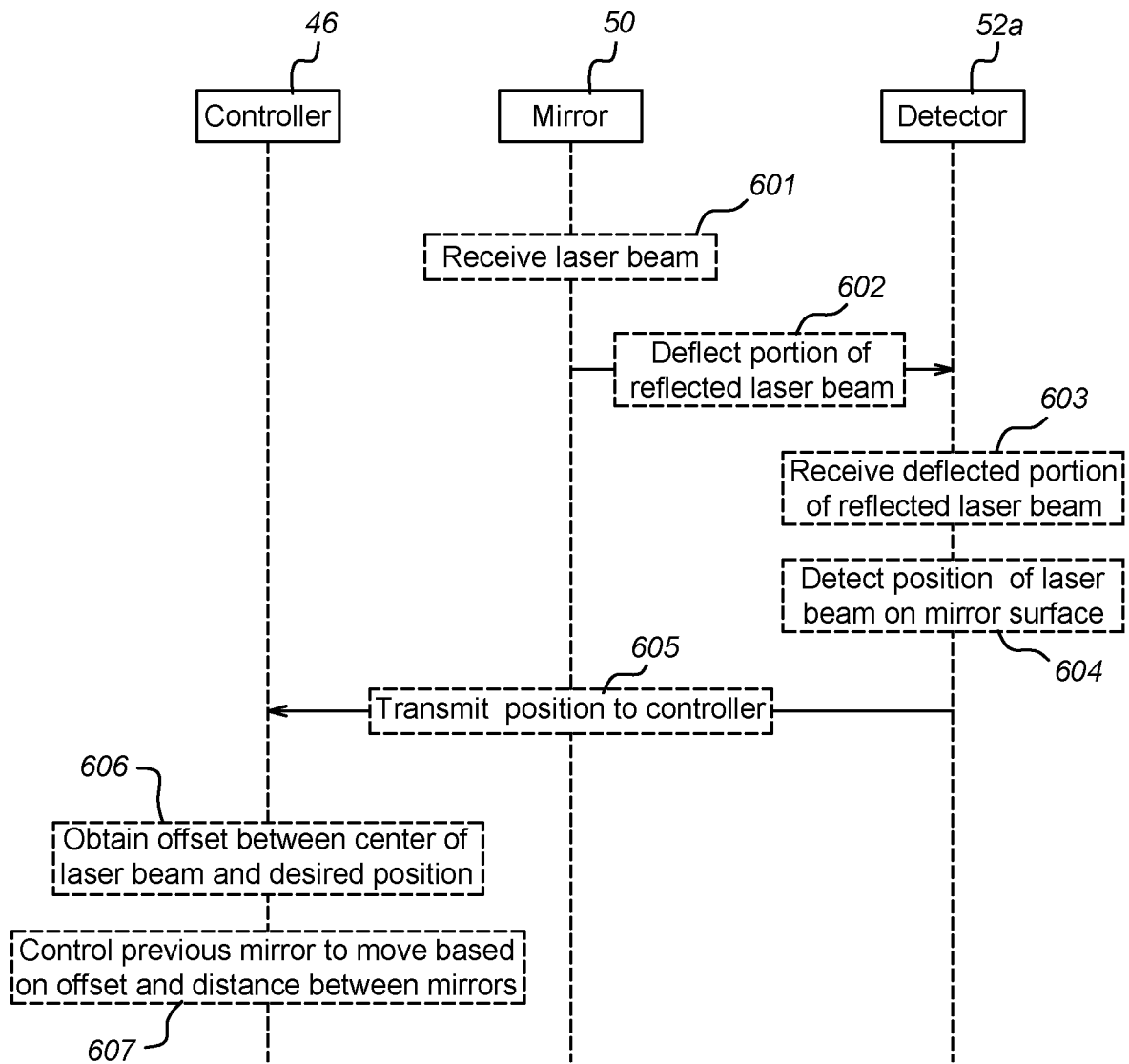
FIG. 6 shows a diagram illustrating a laser beam aligning method according to the present invention.

FIG. 6 shows a diagram illustrating a laser beam aligning method according to an embodiment of the present invention.

More specifically, FIG. 6 shows the interaction between the detectors, the controller and the mirrors in the system.

The diagram of FIG. 6 will be explained with reference to the system of FIG. 3, by way of example and because of its simplicity, but it will be applied in the same manner in a system with more mirrors.

The second mirror 50 receives in step 601 a low-power laser beam. Most of the energy from the laser beam will then be reflected towards a next mirror or an end tool or output. A portion of the laser beam will be deflected towards the first detector 52a of the second mirror in step 602. This portion is deflected differently than the rest of the laser beam due to a surface pattern present on the mirror surface. The surface pattern may be a pattern of dimples located at specific locations on the mirror surface. The dimples may be features milled into the mirror surface which define a very small amount of the laser energy to the detector. The high-power laser beam and the low-power laser beam may originate from the same source, and they may both have initially a diameter of for example 30 millimetres. The low-power laser beam may then go through a collimator which may expand its beam to approximately 6 centimeters, so that it is a close match to the high-power laser system of approximately 9 centimeters. This expansion is done so that the low-power laser beam can also cover the surface pattern on the mirror and the detectors can effectively detect the position of the beam on the mirror surface based on the surface pattern.

The first detector 52a detects in step 603 the portion of the laser beam which has been deflected due to the surface pattern, and detects in step 604 a position of the laser on the mirror surface and a centre of the laser beam based on the deflected portion. In step 605, the first detector 52a transmits the detected position to the controller 46.

In step 606, the controller obtains an "offset" between the centre of the laser beam (beam centreline) and the desired position, such as the mirror centreline, using the received laser beam position from the first detector 52a. The laser offset position is then used in step 607 to change the angle and/or position of the first mirror 48 so that the laser beam aligns with the centre of the measuring mirror. The distance between the first mirror 48 and the second mirror 50 (which is known) is also used in conjunction with the laser beam offset to obtain the magnitude of the angle change required. The motion control system (in more detail described in relation to FIGS. 7a-7b) for the first mirror 48 then moves the mirror within a very short timeframe, for example, a 100 millisecond time frame, before a next update of position information. There is a dead band, or offset tolerance range, where even though an offset is detected, the controller does not instruct the first mirror 48 to move and/or tilt, in order to avoid an inefficient performance, wherein too much power is required to move the first mirror 48 a very small distance and/or inclination. Therefore, no motion occurs within said tolerance range of the offset, and only when the detected offset is above a specific threshold, the controller instructs the first mirror 48 to move and/or tilt.

Figure 7A:
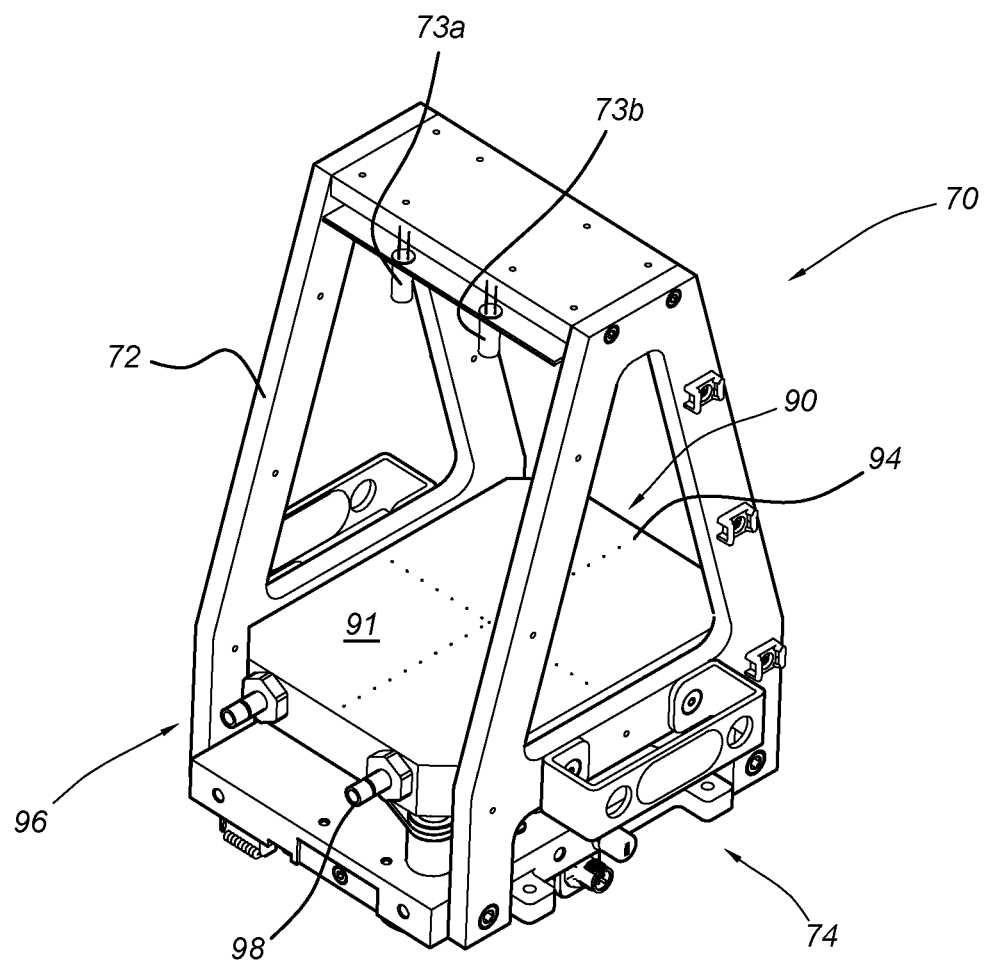
FIG. 7a shows a perspective view of a laser alignment system according to the present invention from a top side.
Figure 7B:
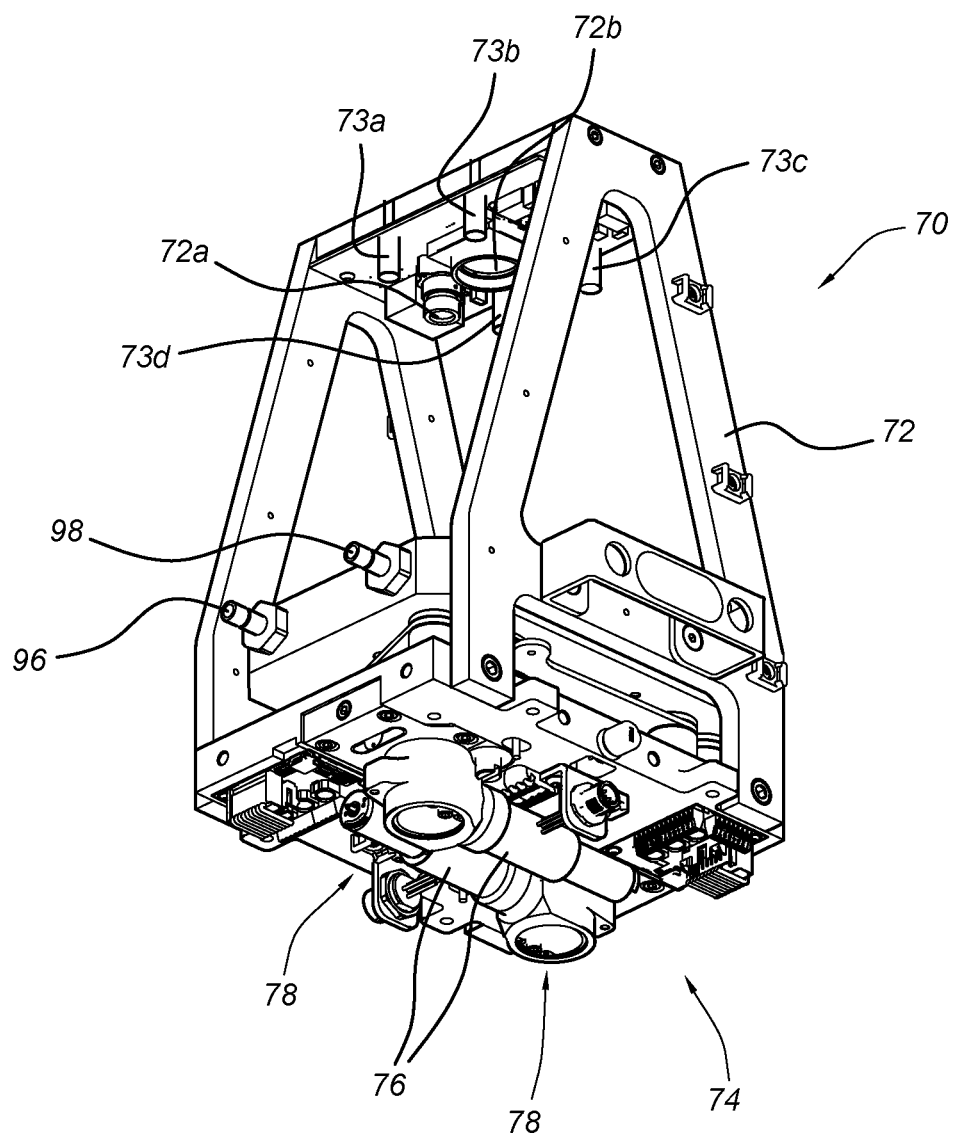
FIG. 7b shows a perspective view of the laser alignment system of FIG. 7a from an under side.

FIG. 7a shows a perspective view of a deflection system 70 of a laser alignment system, from a top side, and FIG. 7b shows a perspective view of the deflection system 70 from an under side. Deflection system 70 includes frame 72, a mirror 90 (which may correspond to the second mirror 50 as disclosed above), a movement system 74 (with motors 76 and drive train 78) for positioning the mirror 90 relative to the frame, and cameras 72a,72b (which may correspond to detectors 52a and 52b as disclosed above). Mirror 90 includes a plurality of elements arranged in a pattern, wherein the elements are applied as dimples 94 at the mirror surface 91. The mirror further comprises an inlet 96 and outlet 98 for a cooling agent, in order to cool the mirror during use.

The mirror surface 91 is typically aluminum or copper though other suitable materials may be used. Inlet 96 and outlet 98 are for the circulation of a cooling agent (e.g., water or gas) to ensure mirror 90 is not overheated during operation when deflecting the laser beam. Dimples 94 can be in any set pattern, and work to deflect a small portion of the laser beam such that cameras 72a, 72b are able to detect the laser beam hitting the mirror surface and the location of the beam on the mirror surface 91. Mirror 90 also includes two sets of 73a, 73c and 73b,73d, each of these sets adapted for independently sending a signal for an automatic shutoff of the laser if it detects that the laser beam gets within a predetermined distance of an edge of the mirror 90 or extends beyond the edge. This can include, for example, one or more safety sensors monitoring a heat load on edges or corners of the mirror 90.

Mirror 90 is connected to frame 72 through movement system 74, which is able to move or tilt mirror 90 with respect to frame 72. This movement can be in one or more directions through one or more motors 76, drive trains 78 and other components (e.g., connectors, brackets, gears) which connect between frame 72 and mirror 90 to controllably move or tilt mirror 90. Mirror 90 is able to be tilted in two directions using two motors 76 and two drive trains 78, though other deflection systems could include more or fewer movement or tilt options. This movement is controlled by the controller 46 as explained in relation with the previous figures. Depending on where deflection system 70 is located within the laser path shown in FIG. 2a, movements and control can vary. For example, a first deflection system located directly after the laser source may typically involve very minimal movements, though a laser beam deflection system located in the wrist 22 may be able to move or tilt in a larger range (or ranges) to accommodate all the different motions in that location.

Cameras 72a, 72b are typically infrared cameras or other types of detectors that are able to detect the laser on mirror 90 and the position of laser on mirror 90. Cameras 72a, 72b are connected to frame 72 at an upper portion, allowing sufficient distance for proper detection on mirror 90 and providing a stable holding position with respect to mirror 90. One camera 72a could be used for detecting the low-powered beam which is solely used for alignment, and one camera 72b could be used for detection of the main or high-powered laser beam, as seen in relation with the previous figures. Other embodiments could have more or fewer cameras, for example, additional cameras for solely beam detection (e.g., for safety to ensure the beam has not been interrupted or otherwise compromised) while the first camera(s) are used for dimple detection. Extra cameras can also be used for redundancy and safety reasons—to have a backup camera in case of a main camera malfunctioning. The mirror has a surface pattern with a plurality of spaced apart element, located on the front face of the mirror, and said surface pattern allows at least a portion of the incident laser beam to be deflected towards the cameras. This surface pattern can be a dimple pattern. The surface pattern, for example the dimples 94, results in some of the laser energy not being reflected along the beam path, making the laser beam more observable on the mirror surface because the part of the laser beam hitting the dimples 94 reflects in a different manner that allows it to be more easily captured by the cameras 72a and 72b. The dimples 94 on mirror 90 are configured and arranged to deflect only a small portion of the beam toward the cameras, e.g., 0.01% to 0.1% of the beam total power. This small deflection can also ensure that the laser energy deflected toward cameras 72a, 72b is not at a level which would damage cameras 72a, 72b. In some embodiments, cameras 72a, 72b may have a shield to further ensure that the laser deflected does not damage the camera and its ability to function. While cameras 72a, 72b are described, another type of detector which can detect the laser beam and position on the mirror could be used, for example, other types of suitable light detectors.

Mirror 90 may be oriented in such a way that the laser beam strikes the mirror surface 91 at for example 45 degrees with respect to a plane perpendicular to the mirror surface plane. Usually, all the laser beam energy would be reflected from the mirror also with an angle of 45 degrees.

However, in order to detect the laser beam position, the dimples 94 are designed so that the part of the laser beam that strikes the dimples is deflected in a different direction, in other words, is deflected, towards the detector (camera) 72a, 72b. If the detector is located opposite to the mirror surface 91, the dimples may be designed such that they are formed as an incision on the surface of the mirror which forms a specific angle with the plane perpendicular to the mirror surface plane, so that the part of the beam incident in the dimples is deflected in the direction of the detector (camera) 72a, 72b.

Frame 72 can be connected to various parts within the base 14, mast 18, shoulder 19, arm 20 and wrist 22 depending on the specific configuration of robotic system 10. The connections must be such that the frame is held steady, and configured so that the laser beam enters one side of frame 72, is deflected by mirror 90 and then exits the other side of frame 72, typically toward a subsequent deflection system 70, mirror or treatment surface. Additionally, the number and configurations of deflection systems 70 can vary depending on system 10 size and requirements.

The movement or tilting of mirror 90 with respect to its frame 72 ensures that laser beam is deflected to the next desired mirror (or other system or surface) despite any movement of the relative parts (e.g., tilting or translation of arm 20 with respect to mast 18). Because the laser beam used for surface treatments and deflected by mirrors is typically very powerful (e.g., 20 kW or more), it is important to ensure that the laser beam is properly directed only where desired to avoid damage to components of robotic system 10 or other nearby systems. Frame 72, cameras 72a, 72b, elements 94 arranged in a pattern at the mirror surface 91, movement system 74 and control and alignment system ensure that the positioning of laser beam on mirror 90 can be detected and the positioning information used to move or tilt previous and/or subsequent mirrors 90 such that the laser beam achieves proper alignment with the one or more mirrors 90 in the system.

Figure 8A:
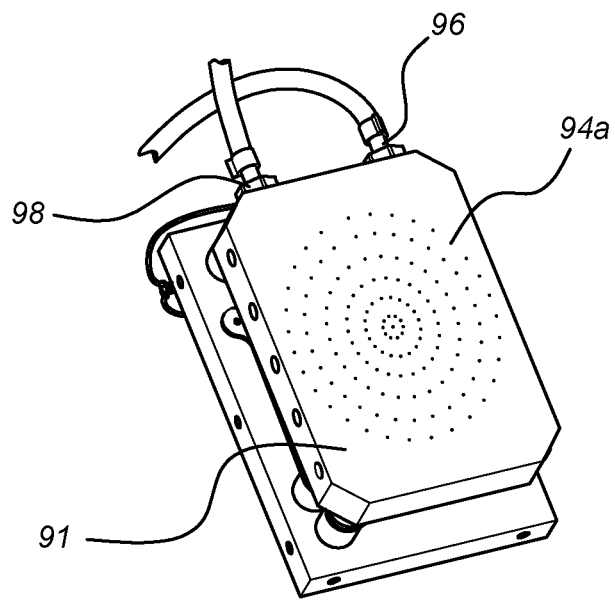
FIG. 8a illustrates a perspective view of a mirror according to an embodiment of the present invention.
Figure 8B:
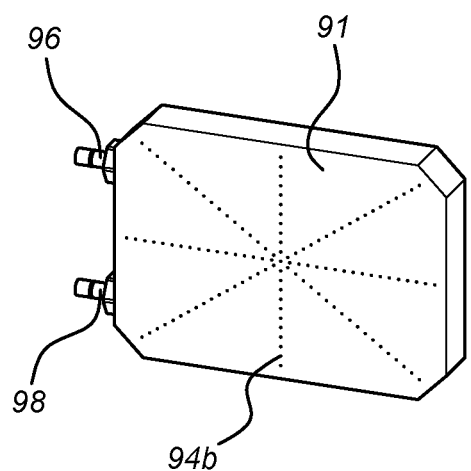
FIG. 8b illustrates a perspective view of a mirror according to an embodiment of the present invention.

FIG. 8a illustrates a perspective view of a mirror surface according to the present invention, and FIG. 8b illustrates another perspective view of a mirror surface according to the present invention.

The surface pattern, which may be a pattern of dimples 94 on the mirror, can be symmetric, for example, a pattern of spaced apart elements 94a in concentric circles as shown in FIG. 8a, or an X-shape pattern 54b as shown in FIG. 7a, or a line pattern as shown in FIG. 8b. These are examples only, and it will be apparent for the skilled person that many other patterns are also possible.

If a detector is an infrared camera, the infrared camera is used to look at the deflected light from the dimples 94a, 94b, on the mirror surface 91. Because most of the laser power is directed away by the mirror, the dimples 94a, 94b, show up as hot spots to the infrared camera. Not all of the dimples are in the laser path at one time so looking at the centroid of illumination can give an indication of the centre of the laser beam.

The mirrors according to the present invention may have a rectangular shape, with a length of each side of minimum 25 millimetres. The mirrors may be made of different materials, such as a copper or aluminum base with gold coating on the outer surface, which is then water cooled.

As seen in the foregoing description, the use of a two stage positioning system and method in which in a first positioning step the mirrors are aligned by a low-power laser beam with a first camera allows for the accurate and efficient alignment and realignment of a laser beam through complicated systems. During the second step, in which the high-power laser beam operates, the mirrors are maintained in position by deflection of a small fraction of laser light away from the beam path to a detector system, such as a camera system (second camera) to maintain the centroid of the beam in a desired position, which may be the mid position of the mirror. By detecting and adjusting the mirrors constantly, proper alignment of a laser beam can be achieved, no matter the number of movements and/or axis changes to which the laser beam and/or vehicle or other components which transfer the laser beam to the output are subjected. This results in a very safe and accurate positioning system, allowing for use of high-powered laser beams without the risk of damaging surrounding parts by misalignment. The surface pattern, such as a pattern of dimples (features on the mirror surface) can be used to minimize the amount of light deflected which maximizes the accuracy of the centroid measurement, thereby further ensuring accurate alignment and the ability to stay well within the mirror surface when aligning and reflecting.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A laser beam alignment system, comprising:
 a first deflection system and a second deflection system arranged downstream thereof, said deflection systems each comprising: a frame, and a mirror having a mirror surface for reflecting a portion of a laser beam incident on said mirror surface as a reflected beam portion;
 the first deflection system further comprising a movement system connected to the frame and to the mirror for positioning the mirror relative to the frame to adjust the angle of the reflected beam portion relative to the mirror surface;
 the second deflection system further comprising:
  a plurality of elements arranged in a pattern at the mirror surface of the second deflection system, for deflecting a portion of the laser beam incident on the elements as a deflected beam portion that is different from the reflected beam portion reflected by said mirror; and one or more detectors, arranged outside the path of the reflected beam portion, for detecting at least part of the deflected beam portion;

at least one controller configured to communicate with the movement system of the first mirror deflection system and the one or more detectors of the second mirror deflection system, and to control said movement system to position the first mirror relative to the frame to align the laser beam on the second mirror based on the detected part of the deflected beam portion.

2. The laser beam alignment system according to claim 1, wherein the beam path between the mirrors of the first and second deflection system is at least 0.5 meters, preferably at least 5 meters.

3. The laser beam alignment system according to claim 1, wherein the mirrors of the first and second deflection system are arranged such that the reflected beam from the first deflection system can travel in a direct straight line to the mirror of the second deflection system.

4. The laser beam alignment system according to claim 1, wherein the mirror surface of the mirror of the first deflection system is substantially planar, and/or wherein the mirror surface of the mirror of the second deflection system is substantially planar.

5. The laser beam alignment system according to claim 1, wherein the first and second deflection system are adapted for aligning and reflecting a laser beam which has an average power output of 10 kilowatt or more during a time period of at least 2 minutes.

6. The laser beam alignment system according to claim 1, wherein when seen in projection on the mirror surface, the combined area of the plurality of elements is less than 0.5% of the area a convex hull of the plurality of elements.

7. The laser beam alignment system according to claim 1, wherein, when seen in projection on the mirror surface, the area of a convex hull of the plurality of element is at least 90 $cm^2$.

8. The laser beam alignment system according to claim 1, wherein the plurality of elements are spaced apart from each other, preferably wherein each element, when seen in projection on the mirror surface, has an area of between 0.01 $cm^2$ and 0.25 $cm^2$.

9. The laser beam alignment system according to claim 1, wherein the pattern includes one or more of: elements arranged spaced apart from each on two or more lines, which lines at an angle to each other, preferably wherein the lines are at angles of integer multiples of 45 degrees to each other; and elements arranged spaced apart from each other on concentric circles.

10. The laser beam alignment system according to claim 1, the second deflection system further comprising a movement system connected to the frame and to the mirror for positioning the mirror relative to the frame to adjust the angle of the reflected beam portion relative to the mirror surface;

the system further comprising a third deflection system downstream of the second deflection system, the third deflection system being provided with:
a frame,
a mirror having a mirror surface for reflecting a portion of a laser beam incident on the mirror as a reflected beam portion;
a plurality of elements arranged in a pattern at the mirror surface of the second deflection system, for deflecting a portion of the laser beam incident on the mirror as a deflected beam portion that is different from the reflected beam portion reflected by said mirror; and
one or more detectors, arranged outside the path of the reflected beam portion, for detecting at least part of the deflected beam portion;
wherein the at least one controller is configured to communicate with the movement system of the second deflection system and the one or more detectors of the third deflection system, and to control said movement system to position the second mirror relative to the frame to align the laser beam on the third mirror based on the detected part of the deflected beam portion.

11. The laser beam alignment system according to claim 1, wherein the second deflector system comprises safety detectors for detecting whether a part of the laser beam travels past the mirror without being incident on the mirror surface or the plurality of elements and/or whether part of the laser beam is within a predetermined distance of an outer edge of the mirror.

12. A robot system comprising a mobile base on which a mast is mounted, wherein an arm is moveably mounted on the mast, and wherein a wrist is moveably mounted on the arm, the robot system further comprising a laser beam alignment system according to claim 1, wherein said laser beam alignment system is arranged within the mast, arm and/or the wrist.

13. The robot system according to claim 12, further comprising a high-power laser generator for generating a laser having an average power output of at least 10 kilowatt during a time period of at least 2 minutes.

14. The robot system according to claim 12, further comprising a low-power laser generator for generating a beam of visible laser light having an average power output of less than 30 watt, wherein the controller is adapted, for, prior to activating high-power laser generator, carrying out initial alignment of the mirrors in the beam alignment system using the low power laser.

* * * * *